(12) United States Patent
Li et al.

(10) Patent No.: US 9,591,313 B2
(45) Date of Patent: Mar. 7, 2017

(54) VIDEO ENCODER WITH TRANSFORM SIZE PREPROCESSING AND METHODS FOR USE THEREWITH

(71) Applicant: ViXS Systems, Inc., Toronto (CA)

(72) Inventors: Ying Li, Richmond Hill (CA); Xu Gang Zhao, Maple (CA)

(73) Assignee: VIXS SYSTEMS, INC., Toronto (CA)

( * ) Notice: Subject to any disclaimer, the term of this patent is extended or adjusted under 35 U.S.C. 154(b) by 245 days.

(21) Appl. No.: 14/196,326

(22) Filed: Mar. 4, 2014

(65) Prior Publication Data

US 2015/0256853 A1  Sep. 10, 2015

(51) Int. Cl.
*H04N 19/122* (2014.01)
*H04N 19/176* (2014.01)
*H04N 19/149* (2014.01)
*H04N 19/12* (2014.01)
*H04N 19/18* (2014.01)

(52) U.S. Cl.
CPC ......... *H04N 19/176* (2014.11); *H04N 19/122* (2014.11); *H04N 19/149* (2014.11); *H04N 19/18* (2014.11)

(58) Field of Classification Search
CPC .. H04N 19/124; H04N 19/176; H04N 19/625; H04N 19/88; H04W 52/0206; Y02B 60/50
USPC .......................................... 375/240.2, 240.18
See application file for complete search history.

(56) References Cited

U.S. PATENT DOCUMENTS

| | | | | |
|---|---|---|---|---|
| 8,483,285 B2* | 7/2013 | Ye | .................. | H04N 19/176 375/240.16 |
| 8,855,203 B2* | 10/2014 | Yamamoto | ....... | H04N 19/00072 375/240.12 |
| 9,042,459 B1* | 5/2015 | Min | .................. | H04N 19/44 375/240.18 |
| 9,042,460 B1* | 5/2015 | Min | .................. | H04N 19/44 375/240.25 |
| 2003/0156648 A1* | 8/2003 | Holcomb | ............. | H04N 19/136 375/240.18 |
| 2009/0262800 A1* | 10/2009 | Zhang | ................. | H04N 19/176 375/240.2 |
| 2014/0177713 A1* | 6/2014 | Yuan | ................. | H04N 19/00533 375/240.12 |
| 2014/0286436 A1* | 9/2014 | Sato | .................... | H04N 19/124 375/240.18 |

* cited by examiner

*Primary Examiner* — Christopher S Kelley
*Assistant Examiner* — Kathleen Walsh
(74) *Attorney, Agent, or Firm* — Garlick & Markison; Bruce E. Stuckman (57) ABSTRACT

A transform size determination module includes a transform size preprocessor configured to process residual data from a picture of the video data to evaluate a plurality of transform block sizes and to generate candidate transform size data that indicates a selected non-null proper subset of the plurality of transform block size. A final transform size determination processor generates final transform block size data that indicates a final transform block size, based on the candidate transform size data.

17 Claims, 9 Drawing Sheets

Video decoding operation

VIDEO ENCODER WITH TRANSFORM SIZE PREPROCESSING AND METHODS FOR USE THEREWITH

CROSS REFERENCE TO RELATED PATENTS

None

TECHNICAL FIELD

The present disclosure relates to encoding used in devices such as video encoders/decoders.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

Efficient and fast encoding and decoding of video signals is important to the implementation of many video devices, particularly video devices that are destined for home use. Encoding algorithms typically include some form of transformation, such as a discrete cosine transform, followed by quantization of the transformed data. Some encoding algorithms allow the flexibility to select the block size used in transformation.

DETAILED DESCRIPTION

Figures 1, 2, 3:
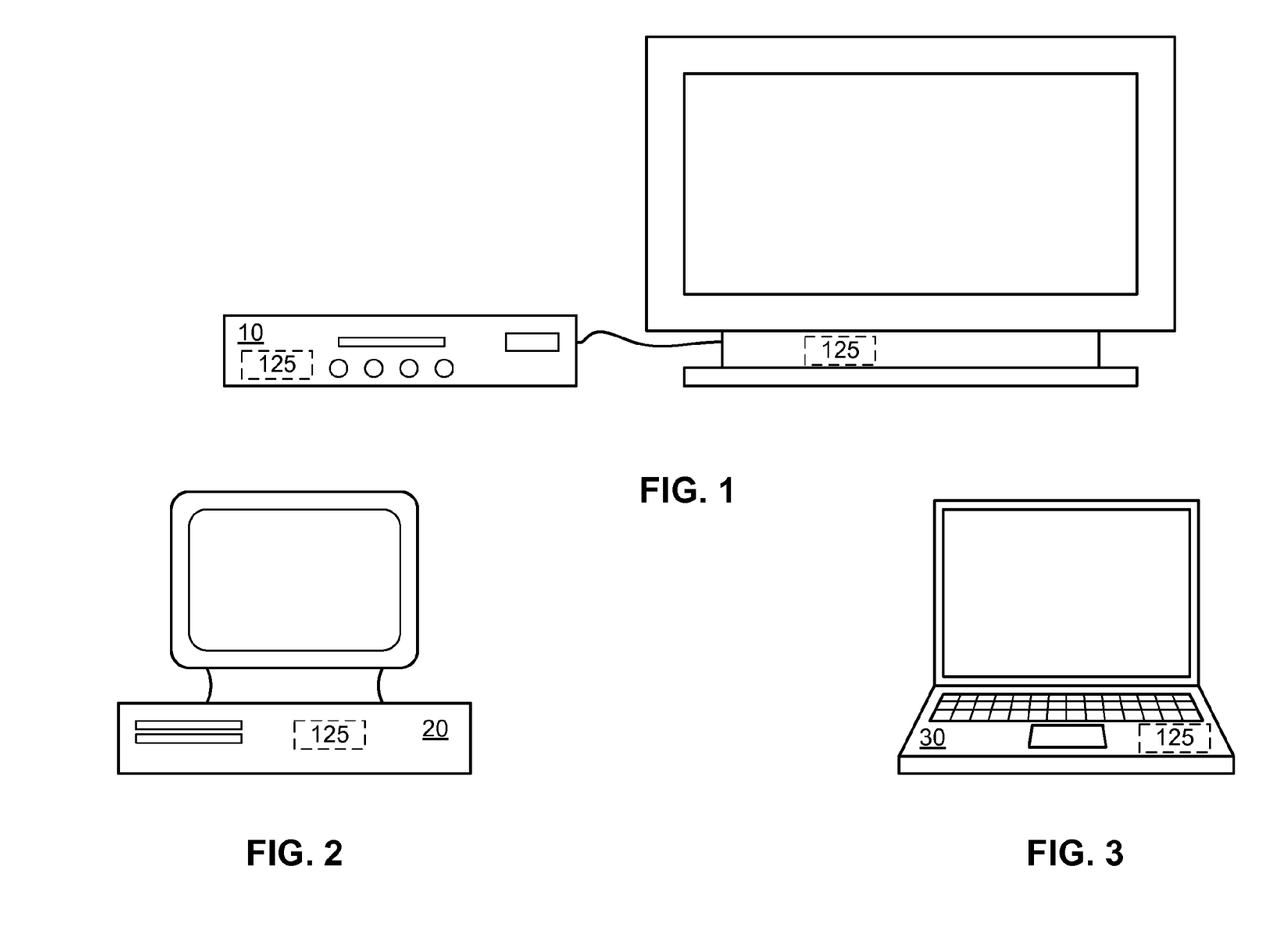
FIGS. 1-3 present pictorial diagram representations of various video devices in accordance with embodiments of the present disclosure.

FIGS. 1-3 present pictorial diagram representations of various video devices in accordance with embodiments of the present disclosure. In particular, set top box 10 with built-in digital video recorder functionality or a stand alone digital video recorder, computer 20 and portable computer 30 illustrate electronic devices that incorporate a video processing device 125 that includes one or more features or functions of the present disclosure. While these particular devices are illustrated, video processing device 125 includes any device that is capable of encoding, decoding and/or transcoding video content in accordance with the methods and systems described in conjunction with FIGS. 4-12 and the appended claims.

Figure 4:
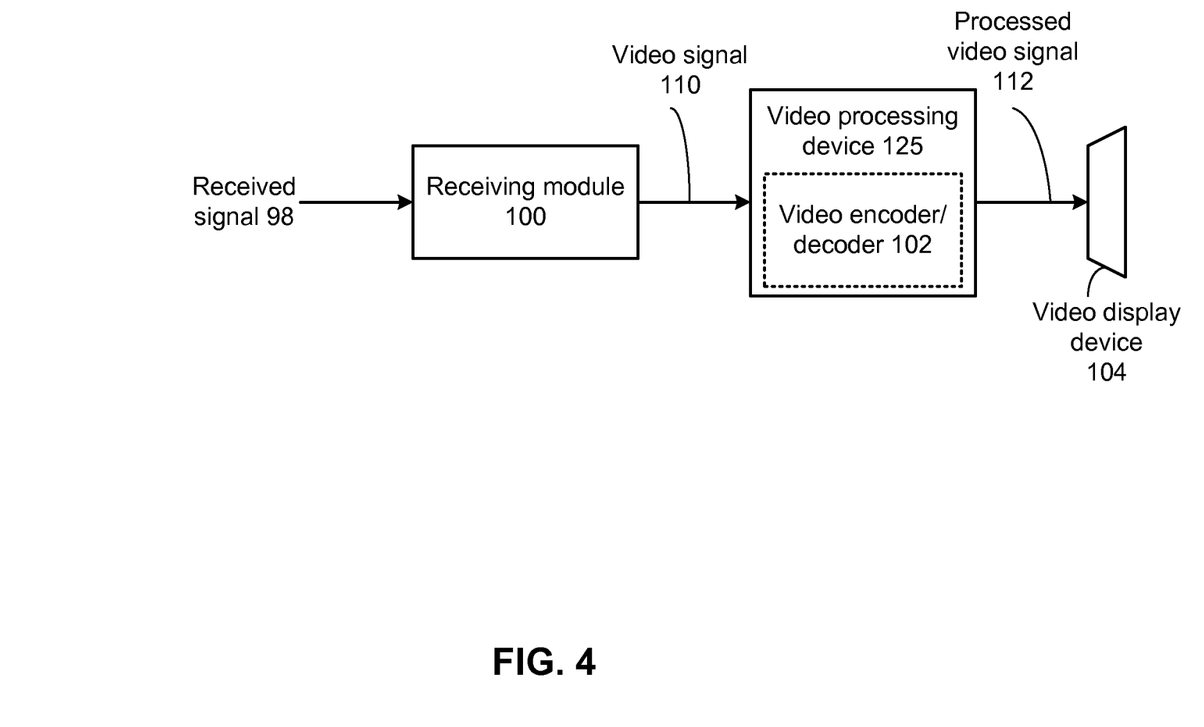
FIG. 4 presents a block diagram representation of a video device in accordance with an embodiment of the present disclosure.

FIG. 4 presents a block diagram representation of a video device in accordance with an embodiment of the present disclosure. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video encoder/decoder 102 and is coupled to the receiving module 100 to encode, decode or transcode the video signal for storage, editing, and/or playback in a format corresponding to video display device 104.

In an embodiment of the present disclosure, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a digital video codec standard such as H.264, MPEG-4 Part 10 Advanced Video Coding (AVC) or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Figure 5:
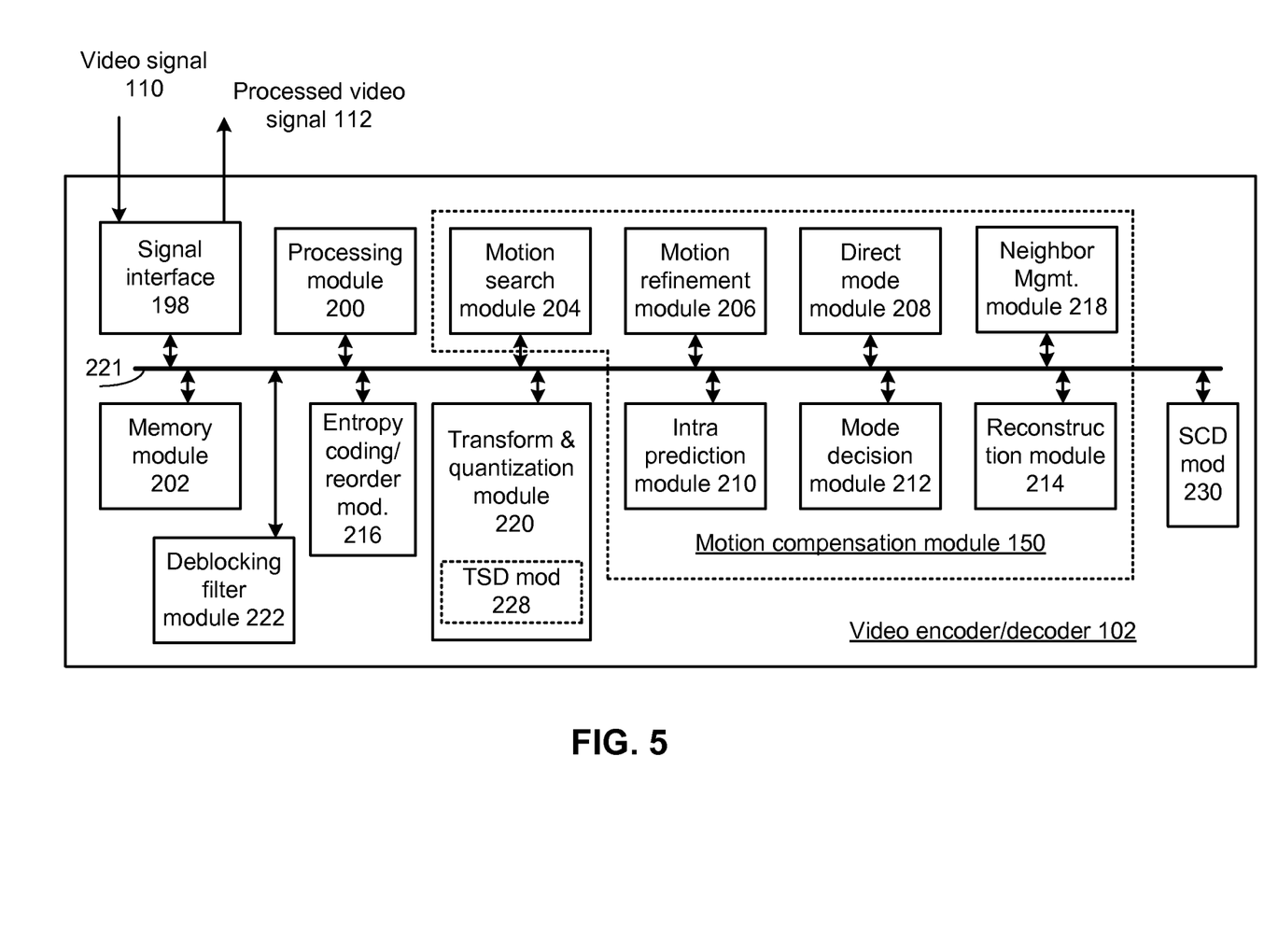
FIG. 5 presents a block diagram representation of a video encoder/decoder in accordance with an embodiment of the present disclosure.

FIG. 5 presents a block diagram representation of a video encoder/decoder in accordance with an embodiment of the present disclosure. In particular, video encoder/decoder 102 can be a video codec that operates in accordance with many of the functions and features of the High Efficiency Video Coding standard (HEVC), H.264 standard, the MPEG-4 standard, VC-1 (SMPTE standard 421M) or other standard, to generate processed video signal 112 by encoding, decoding or transcoding video signal 110. Video signal 110 is optionally formatted by signal interface 198 for encoding, decoding or transcoding.

The video encoder/decoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, neighbor management module 218, forward transform and quantization module 220, deblocking filter module 222, and scene detection module 230. In an embodiment of the present disclosure, the modules of video encoder/decoder 102 can be implemented via an XCODE processing device sold by VIXS Systems, Inc. along with software or firmware. Alternatively, one or more of these modules can be implemented using other hardware, such as another processor or a hardware engine that includes a state machine, analog circuitry, digital circuitry, and/or logic circuitry, and that operates either independently or under the control and/or direction of processing module 200 or one or more of the other modules, depending on the particular implementation. It should also be noted that the software implementations of the present disclosure can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present disclosure.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present disclosure, the operation of the encoding mode utilizes a plurality of modules that each perform a specific encoding function. The operation of decoding also utilizes at least one of these plurality of modules to perform a similar function in decoding. In this fashion, modules such as the motion refinement module 206 and intra-prediction module 210, can be used in both the encoding and decoding process to save on architectural real estate when video encoder/decoder 102 is implemented on an integrated circuit or to achieve other efficiencies. In addition, some or all of the components of the direct mode module 208, mode decision module 212, reconstruction module 214, transformation and quantization module 220, deblocking filter module 222 or other function specific modules can be used in both the encoding and decoding process for similar purposes.

Motion compensation module 150 includes a motion search module 204 that processes pictures from the video signal 110 based on a segmentation into macroblocks of pixel values, such as of 64 pixels by 64 pixels, 32 pixels by 32 pixels, 16 pixels by 16 pixels or some other size, from the columns and rows of a frame and/or field of the video signal 110. In an embodiment of the present disclosure, the motion search module determines, for each macroblock or macroblock pair of a field and/or frame of the video signal, one or more motion vectors that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

While motion search module 204 has been described above in conjunction with full resolution search, motion search module 204 can operate to determine candidate motion search motion vectors partly based on scaled or reduced resolution pictures. In particular, motion search module 204 can operate by downscaling incoming pictures and reference pictures to generate a plurality of downscaled pictures. The motion search module 204 then generates a plurality of motion vector candidates at a downscaled resolution, based on the downscaled pictures. The motion search module 204 operates on full-scale pictures to generate motion search motion vectors at full resolution, based on the motion vector candidates. In another embodiment, the motion search module 204 can generate motion search motion vectors for later refinement by motion refinement module 206, based entirely on pictures at downscaled resolution.

A motion refinement module 206 generates a refined motion vector for each macroblock of the plurality of macroblocks, based on the motion search motion vector. In an embodiment of the present disclosure, the motion refinement module determines, for each macroblock or macroblock pair of a field and/or frame of the video signal 110, a refined motion vector that represents the displacement of the macroblock from a reference frame or reference field of the video signal to a current frame or field.

Based on the pixels and interpolated pixels, the motion refinement module 206 refines the location of the macroblock in the current frame or field to a greater pixel level accuracy such as to a resolution of ¼-pixel or other subpixel resolution. Candidate locations are also evaluated based on a cost formulation to determine the location and refined motion vector that have a most favorable (such as lowest) cost. As in the case with the motion search module, a cost formulation can be based on the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video signal or an estimated predicted motion vector that is determined based on motion vectors from neighboring current macroblocks of a prior row of the video signal. In an embodiment of the present disclosure, the cost calculation avoids the use of neighboring subblocks within the current macroblock. In this fashion, motion refinement module 206 is able to operate on a macroblock to contemporaneously determine the motion search motion vector for each subblock of the macroblock.

When estimated predicted motion vectors are used, the cost formulation avoids the use of motion vectors from the current row and both the motion search module 204 and the motion refinement module 206 can operate in parallel on an entire row of video signal 110, to contemporaneously determine the refined motion vector for each macroblock in the row.

A direct mode module 208 generates a direct mode motion vector for each macroblock, based on macroblocks that neighbor the macroblock. In an embodiment of the present disclosure, the direct mode module 208 operates to determine the direct mode motion vector and the cost associated with the direct mode motion vector based on the cost for candidate direct mode motion vectors for the B slices of video signal 110, such as in a fashion defined by the H.264 or HEVC standard.

While the prior modules have focused on inter-prediction of the motion vector, intra-prediction module 210 generates a best intra prediction mode for each macroblock of the plurality of macroblocks. In an embodiment of the present disclosure, intra-prediction module 210 operates as defined by the HEVC or H.264 standard, however, other intra-prediction techniques can likewise be employed. In particular, intra-prediction module 210 operates to evaluate a plurality of intra prediction modes such as luma prediction modes, chroma prediction or other intra coding, based on motion vectors determined from neighboring macroblocks to determine the best intra prediction mode and the associated cost.

A mode decision module 212 determines a final macroblock cost for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 completes the motion compensation by generating residual luma and/or chroma pixel values for each macroblock of the plurality of macroblocks.

A transform and quantization module 220 of video encoder/decoder 102 generates processed video signal 112 by transforming coding and quantizing the residual pixel values (residual data) into quantized transformed coefficients that can be further coded, such as by entropy coding in entropy coding module 216, filtered by de-blocking filter module 222. In an embodiment of the present disclosure, further formatting and/or buffering can optionally be performed by signal interface 198 and the processed video signal 112 can be represented as being output therefrom.

State-of-the-art video codecs such as an HEVC codec or other codec provide optional transform size selection. This transform size selection not only improves coding efficiency but also adds complexity to encoder. As shown, transform and quantization module 220 includes a transform size determination module 228 that selects the transform block size used in transforming residual data for quantization. Further details regarding the operation of transform size determination module 228 including several optional functions and features will be described in conjunction with FIGS. 6 and 8-10 that follow.

As discussed above, many of the modules of motion compensation module 150 operate based on motion vectors determined for neighboring macroblocks. Neighbor management module 218 generates and stores neighbor data for at least one macroblock of the plurality of macroblocks for retrieval by at least one of the motion search module 204, the motion refinement module 206, the direct mode module 208, intra-prediction module 210, entropy coding module 216 and deblocking filter module 222, when operating on at least one neighboring macroblock of the plurality of macroblocks. In an embodiment of the present disclosure, a data structure, such as a linked list, array or one or more registers are used to associate and store neighbor data for each macroblock in a buffer, cache, shared memory or other memory structure. Neighbor data includes motion vectors, reference indices, quantization parameters, coded-block patterns, macroblock types, intra/inter prediction module types, neighboring pixel values and or other data from neighboring macroblocks and/or subblocks used by one or more of the modules or procedures of the present disclosure to calculate results for a current macroblock. For example, in order to determine the predicated motion vector for the motion search module 204 and motion refinement module 206, both the motion vectors and reference index of neighbors are required. In addition to this data, the direct mode module 208 requires the motion vectors of the co-located macroblock of previous reference pictures. The deblocking filter module 222 operates according to a set of filtering strengths determined by using the neighbors' motion vectors, quantization parameters, reference index, and coded-block-patterns, etc. For entropy coding in entropy coding module 216, the motion vector differences (MVD), macroblock types, quantization parameter delta, inter predication type, etc. are required.

Consider the example where a particular macroblock MB(x,y) requires neighbor data from macroblocks MB(x−1, y−1), MB(x, y−1), MB (x+1,y−1) and MB(x−1,y). In prior art codecs, the preparation of the neighbor data needs to calculate the location of the relevant neighbor sub-blocks. However, the calculation is not as straightforward as it was in conventional video coding standards. For example, in H.264 coding, the support of multiple partition types make the size and shape for the subblocks vary significantly. Furthermore, the support of the macroblock adaptive frame and field (MBAFF) coding allows the macroblocks to be either in frame or in field mode. For each mode, one neighbor derivation method is defined in H.264. So the calculation needs to consider each mode accordingly. In addition, in order to get all of the neighbor data required, the derivation needs to be invoked four times since there are four neighbors involved—MB(x−1, y−1), MB(x, y−1), MB(x+1, y−1), and MB(x−1, y). So the encoding of the current macroblock MB(x, y) cannot start not until the location of the four neighbors has been determined and their data have been fetched from memory.

In an embodiment of the present disclosure, when each macroblock is processed and final motion vectors and encoded data are determined, neighbor data is stored in data structures for each neighboring macroblock that will need this data. Since the neighbor data is prepared in advance, the current macroblock MB(x,y) can start right away when it is ready to be processed. The burden of pinpointing neighbors is virtually re-allocated to its preceding macroblocks. The encoding of macroblocks can be therefore be more streamlined and faster. For example, when the final motion vectors are determined for MB(x−1,y−1), neighbor data is stored for each neighboring macroblock that is yet to be processed, including MB(x,y) and also other neighboring macroblocks such as MB(x, y−1), MB(x−2,y) MB(x−1,y). Similarly, when the final motion vectors are determined for MB(x,y−1), MB (x+1,y−1) and MB(x−1,y), neighbor data is stored for each neighboring macroblock corresponding to each of these macroblocks that are yet to be processed, including MB(x,y). In this fashion, when MB(x,y) is ready to be processed, the neighbor data is already stored in a data structure that corresponds to this macroblock for fast retrieval.

The motion compensation can then proceed using the retrieved data. In particular, the motion search module 204 and/or the motion refinement module 206, can generate at least one predicted motion vector (such as a standard PMV or estimated predicted motion vector) for each macroblock of the plurality of macroblocks using retrieved neighbor data. Further, the direct mode module 208 can generate at least one direct mode motion vector for each macroblock of the plurality of macroblocks using retrieved neighbor data and the intra-prediction module 210 can generate the best intra prediction mode for each macroblock of the plurality of macroblocks using retrieved neighbor data, and the coding module 216 can use retrieved neighbor data in entropy coding, each as set forth in the HEVC standard, H.264 standard, the MPEG-4 standard, VC-1 (SMPTE standard 421M) or by other standard or other means.

Scene detection module 230 detects scene changes in the video signal 110 based, for example on motion detection in the video signal 110. In an embodiment of the present disclosure, scene detection module 230 generates a motion identification signal for each picture video signal 110. The motion in each picture, such as a video field (or frame if it is progressive-scan video source), can be represented by a parameter called Global Motion (GM). The value of GM quantifies the change of the field compared to the previous same-parity field. In terms of each macroblock pair, the top field is compared to the top field, bottom field compared to bottom field, etc. The value of GM can be computed as the sum of Pixel Motion (PM) over all pixels in the field or frame, where the value of PM is calculated for each pixel in the field or frame.

The parameter GM, can be used to detect a scene change in the video signal 110. When the scene change happens on a field, the field will generate considerably higher GM value compared to "normal" fields. A scene change can be detected by analyzing the GM pattern along consecutive fields, for example by detecting an increase or decrease in GM in consecutive fields that exceeds a scene detection threshold.

Once a scene change is detected that corresponds to a particular image, encoding parameters of encoder/decoder 102 can be adjusted to achieve better results. For example, the detection of a scene change can be used to trigger the start of a new group of pictures (GOP). In another example, the encoder/decoder 102 responds to a scene change detection by adjusting the values of QP to compensate for the scene change, by enabling or disabling video filters or by adjusting or adapting other parameters of the encoding, decoding, transcoding or other processing by encoder/decoder 102.

While not expressly shown, video encoder/decoder 102 can include a memory cache, shared memory, a memory management module, a comb filter or other video filter, and/or other module to support the encoding of video signal 110 into processed video signal 112.

Further details of general encoding and decoding processes will be described in greater detail in conjunction with FIGS. 6 and 7.

Figure 6:
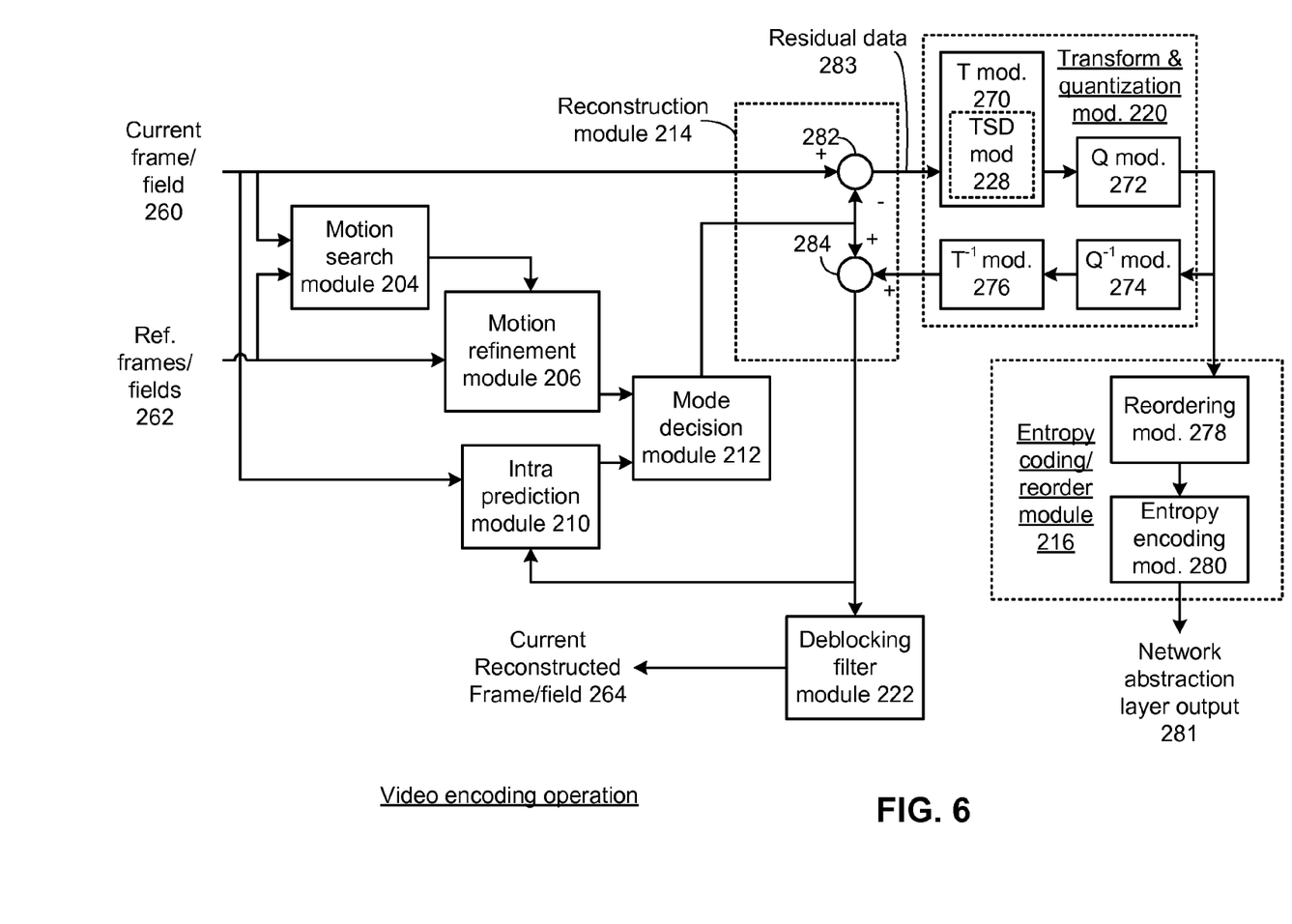
FIG. 6 presents a block flow diagram of a video encoding operation in accordance with an embodiment of the present disclosure.

FIG. 6 presents a block flow diagram of a video encoding operation in accordance with an embodiment of the present disclosure. In particular, an example video encoding operation is shown that uses many of the function specific modules described in conjunction with FIG. 5 to implement a similar encoding operation. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual data 283 in the form of residual pixel values corresponding to the final motion vector for each macroblock of the plurality of macroblocks by subtraction from the pixel values of the current frame/field 260 by difference circuit 282. The reconstruction module 214 also generates unfiltered reconstructed frames/fields by re-adding residual pixel values (processed through transform and quantization module 220) using adding circuit 284.

The transform and quantization module 220 transforms and quantizes the residual pixel values in transform module 270 and quantization module 272 and re-forms residual pixel values by inverse transforming and dequantization in inverse transform module 276 and dequantization module 274. As shown, transform module 270 includes a transform size determination module 228 that selects the transform block size used in transforming residual data for quantization. The quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields. It should also be noted that current reconstructed frames/fields 264 can be buffered to generate reference frames/fields 262 for future current frames/fields 260.

As discussed in conjunction with FIG. 5, one or more of the modules of video encoder/decoder 102 can also be used in the decoding process as will be described further in conjunction with FIG. 7.

Figure 7:
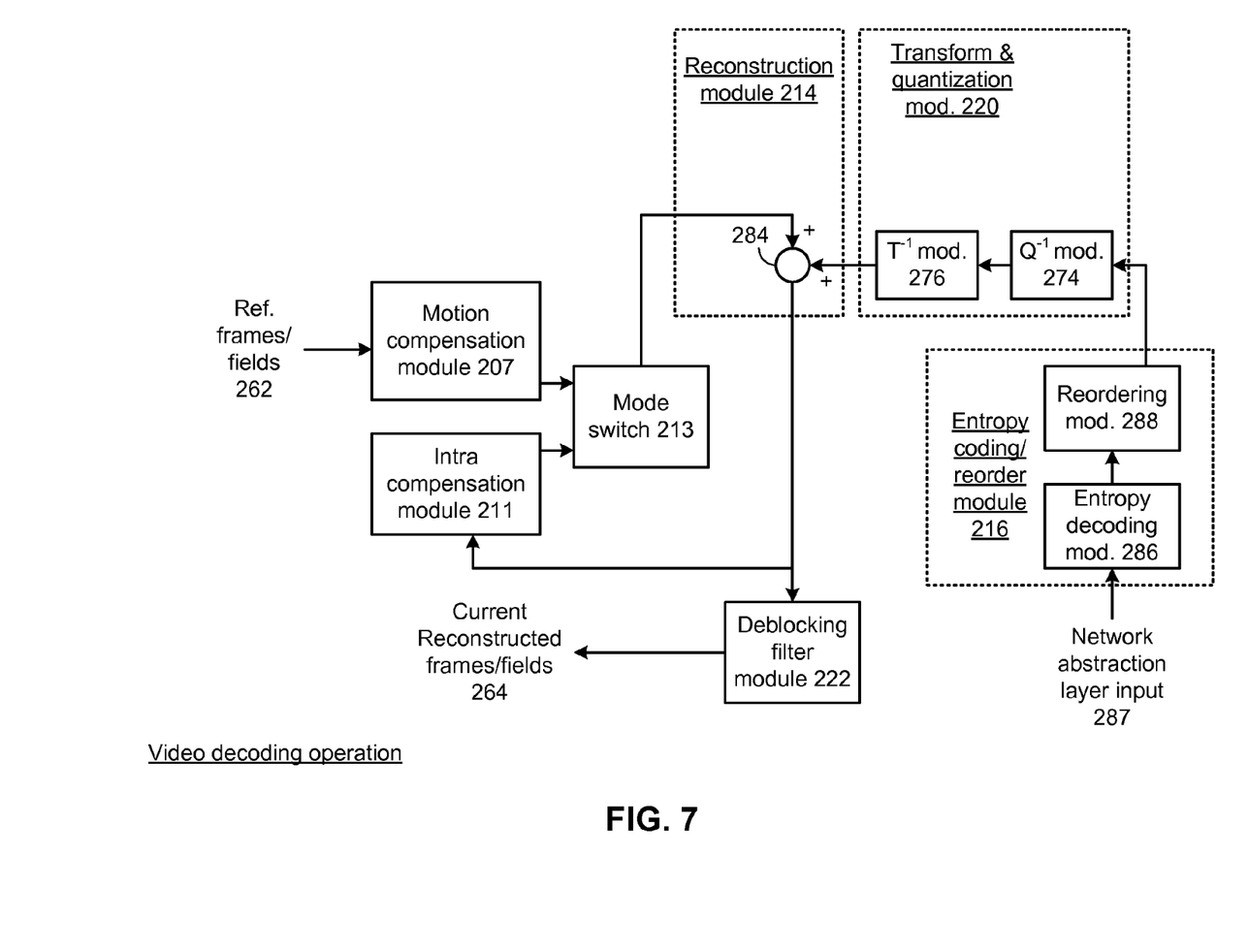
FIG. 7 presents a block flow diagram of a video decoding operation in accordance with an embodiment of the present disclosure.

FIG. 7 presents a block flow diagram of a video decoding operation in accordance with an embodiment of the present disclosure. In particular, this video decoding operation contains many common elements described in conjunction with FIG. 6 that are referred to by common reference numerals. In this case, the motion compensation module 207, the intra-compensation module 211, the mode switch 213, process reference frames/fields 262 to generate current reconstructed frames/fields 264. In addition, the reconstruction module 214 reuses the adding circuit 284 and the transform and quantization module reuses the inverse transform module 276 and the inverse quantization module 274. It should be noted that while entropy coding/reorder module 216 is reused, instead of reordering module 278 and entropy encoding module 280 producing the network abstraction layer output 281, network abstraction layer input 287 is processed by entropy decoding module 286 and reordering module 288.

While the reuse of modules, such as particular function specific hardware engines, has been described in conjunction with the specific encoding and decoding operations of FIGS. 6 and 7, the present disclosure can likewise be similarly employed to the other embodiments of the present disclosure described in conjunction with FIGS. 1-5 and 8-14 and/or with other function specific modules used in conjunction with video encoding and decoding.

Figure 8:
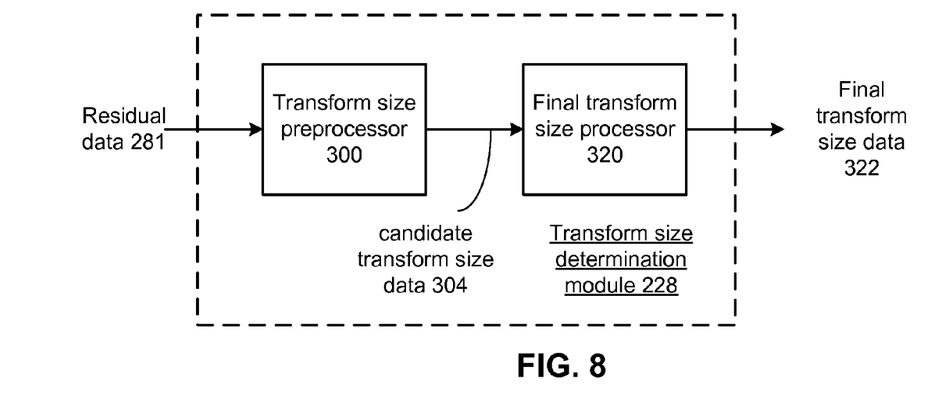
FIG. 8 presents a block diagram representation of a transform size determination module in accordance with an embodiment of the present disclosure.

FIG. 8 presents a block diagram representation of a transform size determination module in accordance with an embodiment of the present disclosure. The transform size determination module 228 includes a transform size preprocessor 300 and a final transform size processor 320. The transform size preprocessor 300 is configured to process blocks of residual data 283 from a picture of the video data to evaluate a plurality of transform block sizes. Based on this evaluation, the transform size preprocessor 300 generates candidate transform size data 302 that indicates a selected subset, such as a non-null proper subset of the plurality of transform block sizes that includes less than all possible transform block sizes, but includes at least one candidate transform block size.

The final transform size determination processor 320 generates final transform block size data 322 that indicates a final transform block size, based on the candidate transform size data 302. The transform size preprocessor 300 and final transform size processor 320 can be implemented via a single processing device such as a dedicated or shared processing device or via one or more separate processing devices.

Consider an example where the transform size determination module 228 operates in accordance with the HEVC standard to generate final transform size data 322. Transform block sizes of 4×4, 8×8, 16×16, 32×32 and 64×64 can be considered in conjunction with the permitted combinations of partitions of a block into sub-blocks. Considering all permitted partitionings of a block, there are over 100 possible combinations of block sizes that can be used in transforming a single 64×64 block of residual data 283. Applying a full rate distortion optimization for each transform block size/partition can place a heavy computational burden on any transform module 270. In operation, the pre-processing and transform size determination module 228 attempts to narrow down the possible block sizes/partitions considered in final processing by final transform size processor 320. In this fashion, unlikely or undesirable candidates are eliminated by less rigorous techniques. A more limited set of candidates is subjected to the more rigorous final processing by the final transform size processor 320. This more rigorous processing can include an evaluation of only those candidates selected for the non-null proper subset of the plurality of transform block sizes indicated by the candidate transform size data. In particular, the narrowed down group of transform block sizes can be evaluated via rate distortion optimization or other analysis technique to determine the final transform block size/partitionings to be employed.

In an embodiment, the transform size preprocessor 300 evaluates the plurality of transform block sizes based on texture data generated, for example, based on mean and variance of the residual data. Evaluating the texture data can include comparing the variance data to one or more variance thresholds.

In an embodiment, transform size preprocessor 300 evaluates a first transform block size of the plurality of transform block sizes based on evaluating a block of the residual data having first block size corresponding the first transform block size. The evaluation of this block of residual data includes evaluating the residual data corresponding to a plurality of sub-blocks of the block. Further, the transform size preprocessor 300 can evaluate the plurality of transform block sizes based on a sum of absolute discrete cosine transforms of the residual data.

Figure 9:
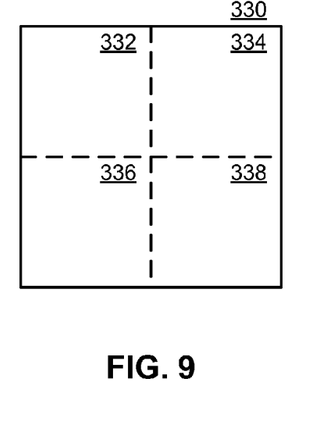
FIG. 9 presents a graphical representation of a block of residual data in accordance with an embodiment of the present disclosure.

FIG. 9 presents a graphical representation of a block of residual data in accordance with an embodiment of the present disclosure. Consider again an example where the transform size determination module 228 operates in accordance with the HEVC standard to generate final transform size data 322. Transform block sizes of 4×4, 8×8, 16×16, 32×32 and 64×64 can be considered in conjunction with the permitted combinations of partitions of a block into sub-blocks. In this example, a block 330 of residual data, such as residual data 283, is presented. As shown, the block 330 can be partitioned into the subblocks 332, 334, 336 and 338.

In this example, the transform size preprocessor 300 iteratively evaluates the plurality of transform block sizes based on an evaluation of blocks of residual data of different sizes. In particular, particular block sizes are considered in conjunction with its subblocks. The method begins with the largest block size and uses texture information. This texture information can be determined based on variances and means of residual data contained in the block. In addition, the sum of absolute DCTs for a block can be used to evaluate a block and its subblocks to determine if further partitioning of the block into smaller sizes is desirable. If a block size is accepted, the corresponding transform block size is included in a subset of possible transform block sizes. The method proceeds iteratively to smaller and smaller block sizes as long as further partitioning is desirable. When no further partitioning is required, the method ends—even if not all possible block sizes have been evaluated. In this fashion, the transform size preprocessor is not required to search all possible transform block sizes—and instead can terminate the evaluation early, when desired, when the evaluation of a larger block size indicates that further partitioning is unnecessary or otherwise undesirable.

In accordance with this example, the method uses four thresholds:
uniformVarThresh, a measure of variance of block residual data corresponding to relatively smooth texture;

roughVarThresh, a measure of variance of block residual data corresponding to relatively rough texture;

uniformAvgThresh, a measure of the mean of block residual data that indicates similarity of block residual means;

dctThreshold, a measure that indicates similar DCT values between two blocks;

Each of these values can be either prestored constant values or otherwise predetermined via a look-up table, function or other calculation based on other quantities such as the block size being evaluated, the transform block partition depth and/or the Lagrange multiplier value λ used in rate distortion optimization.

As discussed above, the method proceeds iteratively, from the largest allowed transform block size to smaller sizes as small as the second smallest size as long as partitioning is selected and the current block size is selected. The method can stop when no partition is selected for the current size block.

Step 1

Calculate the variance of the residual data for each subblock of the current block. Determine if all subblocks of the current block have variances less than uniformVarThresh. If so, calculate the mean of the residual data for each of the subblocks. If the maximum difference between the means is less than the uniformAvgThresh, no partition is needed. In this case stop partitioning, include the current block size as a candidate but do not include the subblock size as a candidate. If the difference is much bigger compared to uniformAvgThresh (for example, n times larger, where n is a number such as 3, 4, etc.), proceed to the evaluate the subblock size, but do not include the block size as a candidate. If neither of these conditions is met proceed to step 2.

Step 2

Compare the subblock variances to both the uniformVarThresh and the roughVarThresh. If the set of subblocks include a subblock that contains smooth texture (variance less than uniformVarThresh) and a subblock that contains rough texture (variance bigger than roughVarThresh), partitioning is selected. In this case, do not include the current block size as a candidate and proceed to the next iteration to evaluate the subblock size. Otherwise proceed to step 3.

Step 3

Calculate DCT transforms for the full block with a block size transform. Calculate the DCT transforms for the sub blocks with a sub-block size transform. Calculate absolute sums of DCT for each result—which may also adjusted by different scale factors. If the difference between the block and the subblock absolute sums of DCT is less than dctThreshold, both no partition and partition should be candidates for final decision process; otherwise, only the one with smaller absolute sum will be selected as a candidate transform size.

Figure 10:
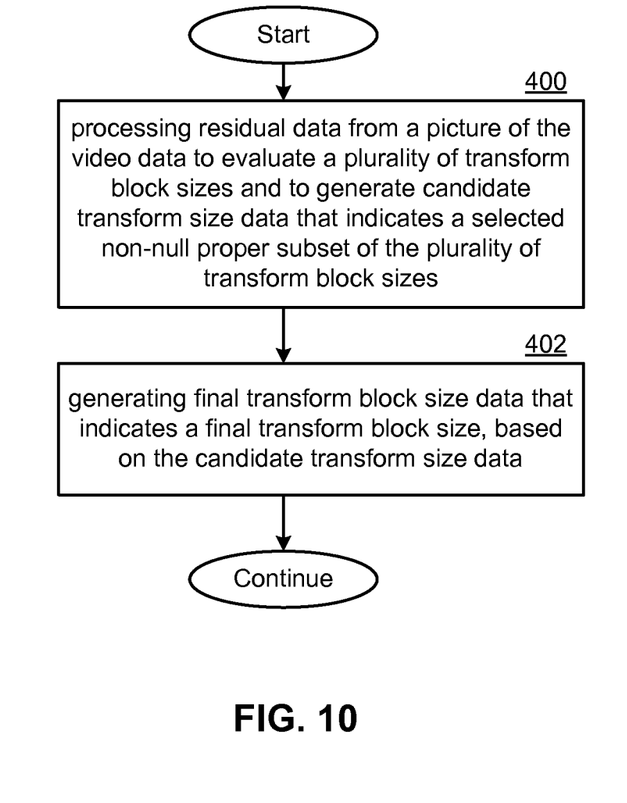
FIG. 10 presents a flowchart representation of a method in accordance with an embodiment of the present disclosure.

FIG. 10 presents a flowchart representation of a method in accordance with an embodiment of the present disclosure. In particular, a method is presented for use in conjunction with a video processing device having one or more of the features and functions described in association with FIGS. 1-9. Step 400 includes processing residual data from a picture of the video data to evaluate a plurality of transform block sizes and to generate candidate transform size data that indicates a selected non-null proper subset of the plurality of transform block sizes. Step 402 includes generating final transform block size data that indicates a final transform block size, based on the candidate transform size data.

In an embodiment, step 402 uses rate distortion optimization to evaluate only the selected non-null proper subset of the plurality of transform block sizes indicated by the candidate transform size data. Step 400 can be based on texture data that includes variance and/or mean data. Evaluating the texture data can include comparing the variance data to at least one variance threshold.

In an embodiment, step 400 includes evaluating a first transform block size of the plurality of transform block sizes based on evaluating a block of the residual data having a first block size corresponding the first transform block size. Evaluating the block of the residual data includes evaluating the residual data corresponding to a plurality of sub-blocks of the block. Step 400 can include generating a sum of absolute discrete cosine transforms of the residual data. The plurality of transform block sizes can include less than all possible transform block sizes.

Figure 11:
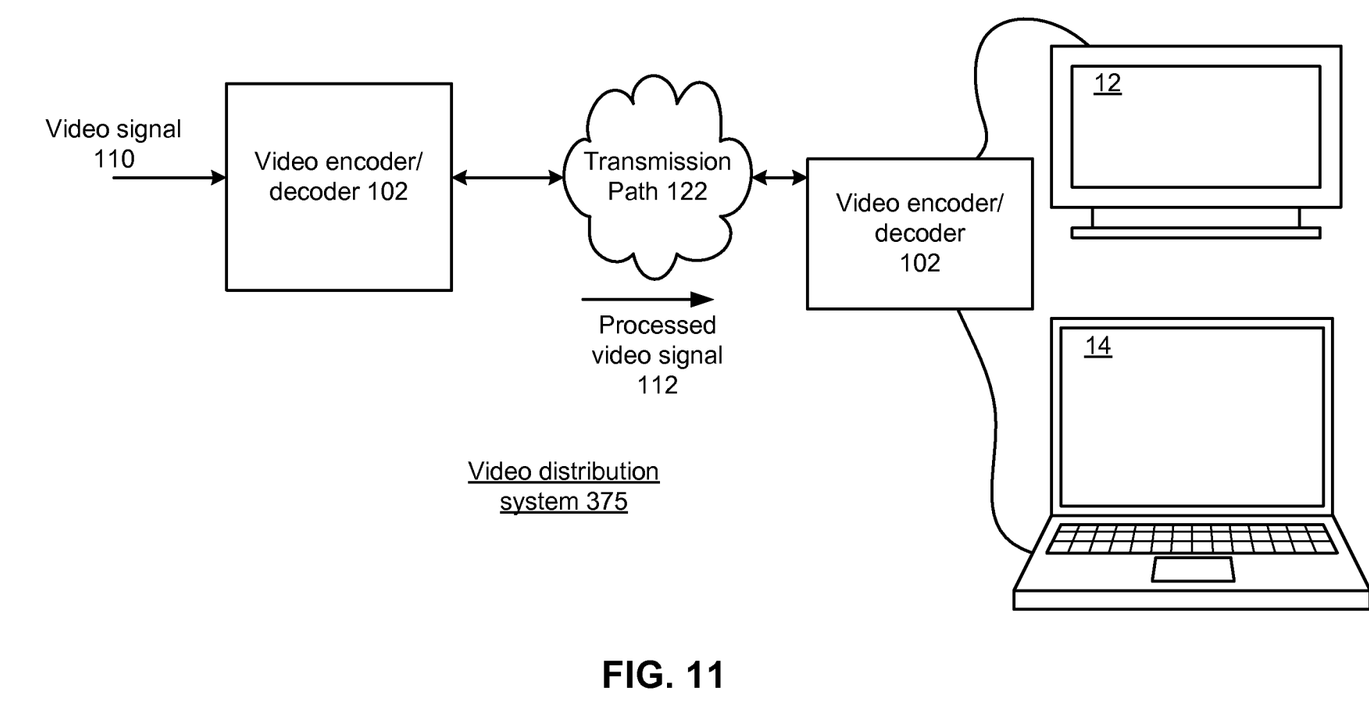
FIG. 11 presents a block diagram representation of a video distribution system 375 in accordance with an embodiment of the present disclosure.

FIG. 11 presents a block diagram representation of a video distribution system 375 in accordance with an embodiment of the present disclosure. In particular, processed video signal 112 is transmitted from a first video encoder/decoder 102 via a transmission path 122 to a second video encoder/decoder 102 that operates as a decoder. The second video encoder/decoder 102 operates to decode the processed video signal 112 for display on a display device such as television 12, computer 14 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 12:
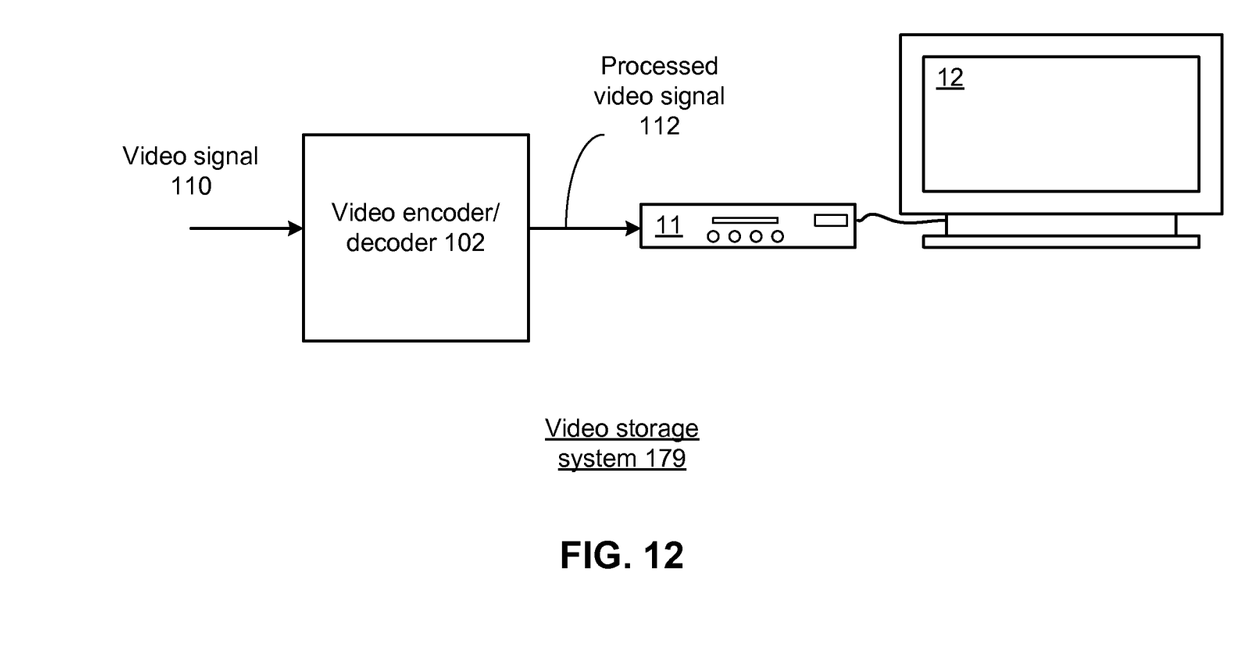
FIG. 12 presents a block diagram representation of a video storage system 179 in accordance with an embodiment of the present disclosure.

FIG. 12 presents a block diagram representation of a video storage system 179 in accordance with an embodiment of the present disclosure. In particular, device 11 is a set top box with built-in digital video recorder functionality, a stand alone digital video recorder, a DVD recorder/player or other device that stores the processed video signal 112 for display on video display device such as television 12. While video encoder/decoder 102 is shown as a separate device, it can further be incorporated into device 11. In this configuration, video encoder/decoder 102 can further operate to decode the processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present disclosure as described herein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A transform size determination module for use in a video encoder that encodes a video signal, the transform size determination module comprising:
    a transform size preprocessor configured to process residual data from a picture of the video signal to evaluate a plurality of transform block sizes and to generate candidate transform size data that indicates a selected non-null proper subset of the plurality of transform block sizes, wherein the transform size preprocessor generates the candidate transform size data to determine the selected non-null proper subset of the plurality of transform block sizes by sequentially evaluating ones of the plurality of transform block sizes in successive iterations based on the residual data from the picture, wherein each of the successive iterations includes:
    (a) evaluating one of the plurality of transform block sizes to determine whether block partitioning is selected;
    (b) when no block partitioning is selected for the one of the plurality of transform block sizes, terminating the sequentially evaluating, including the one of the plurality of transform block sizes in the selected non-null proper subset of the plurality of transform block sizes, while excluding smaller ones of the plurality of transform block sizes from the selected non-null proper subset of the plurality of transform block sizes;
    (c) when block partitioning is selected for the one of the plurality of transform block sizes, determine whether to include the one of the plurality of transform block sizes in the selected non-null proper subset of the plurality of transform block sizes; and
    (d) returning to step (a) to perform a next successive iteration on a next one of the plurality of transform block sizes; and
    a final transform size determination processor, coupled to the transform size preprocessor, generates final transform block size data that indicates a final transform block size, based on the candidate transform size data.

2. The transform size determination module of claim 1 wherein the final transform size determination processor uses rate distortion optimization to evaluate only the selected non-null proper subset of the plurality of transform block sizes indicated by the candidate transform size data.

3. The transform size determination module of claim 1 wherein the transform size preprocessor evaluates the plurality of transform block sizes based on texture data.

4. The transform size determination module of claim 3 wherein the texture data includes variance data.

5. The transform size determination module of claim 4 wherein evaluating the texture data includes comparing the variance data to at least one variance threshold.

6. The transform size determination module of claim 4 wherein evaluating the texture data includes comparing the variance data to a plurality of variance thresholds.

7. The transform size determination module of claim 1 wherein the transform size preprocessor evaluates a first transform block size of the plurality of transform block sizes based on evaluating a block of the residual data having first block size corresponding the first transform block size, wherein evaluating the block of the residual data includes evaluating the residual data corresponding to a plurality of sub-blocks of the block.

8. The transform size determination module of claim 1 wherein the transform size preprocessor evaluates the plurality of transform block sizes based on a sum of absolute discrete cosine transforms of the residual data.

9. The transform size determination module of claim 1 wherein the plurality of transform block sizes includes less than all possible transform block sizes.

10. A method for use in a video encoder that encodes a video signal, the method comprising:
    processing residual data from a picture of the video signal to evaluate a plurality of transform block sizes and to generate candidate transform size data that indicates a selected non-null proper subset of the plurality of transform block sizes, wherein the candidate transform size data is generated to determine the selected non-null proper subset of the plurality of transform block sizes by sequentially evaluating ones of the plurality of transform block sizes in successive iterations based on the residual data from the picture, wherein each of the successive iterations includes:
    (a) evaluating one of the plurality of transform block sizes to determine whether block partitioning is selected;
    (b) when no block partitioning is selected for the one of the plurality of transform block sizes, terminating the sequentially evaluating, including the one of the plurality of transform block sizes in the selected non-null proper subset of the plurality of transform block sizes, while excluding smaller ones of the plurality of transform block sizes from the selected non-null proper subset of the plurality of transform block sizes;
    (c) when block partitioning is selected for the one of the plurality of transform block sizes, determine whether to include the one of the plurality of transform block sizes in the selected non-null proper subset of the plurality of transform block sizes; and
    (d) returning to step (a) to perform a next successive iteration on a next one of the plurality of transform block sizes; and
    generating final transform block size data that indicates a final transform block size, based on the candidate transform size data.

11. The method of claim 10 wherein generating the final transform block size data uses rate distortion optimization to evaluate only the selected non-null proper subset of the plurality of transform block sizes indicated by the candidate transform size data.

12. The method of claim 10 wherein evaluating the plurality of transform block sizes is based on texture data.

13. The method of claim 12 wherein the texture data includes variance data.

14. The method of claim 13 wherein evaluating the texture data includes comparing the variance data to at least one variance threshold.

15. The method of claim 12 wherein evaluating the plurality of transform block sizes includes evaluating a first transform block size of the plurality of transform block sizes based on evaluating a block of the residual data having first block size corresponding the first transform block size, wherein evaluating the block of the residual data includes evaluating the residual data corresponding to a plurality of sub-blocks of the block.

16. The method of claim 10 wherein evaluating the plurality of transform block sizes includes generating a sum of absolute discrete cosine transforms of the residual data.

17. The method of claim 10 wherein the plurality of transform block sizes includes less than all possible transform block sizes.

\* \* \* \* \*